June 21, 1927.

J. W. ESKHOLME 1,633,245

STAMP CANCELING MACHINE

Original Filed March 9 1925    13 Sheets-Sheet 1

INVENTOR
John W. Eskholme

ATTORNEY

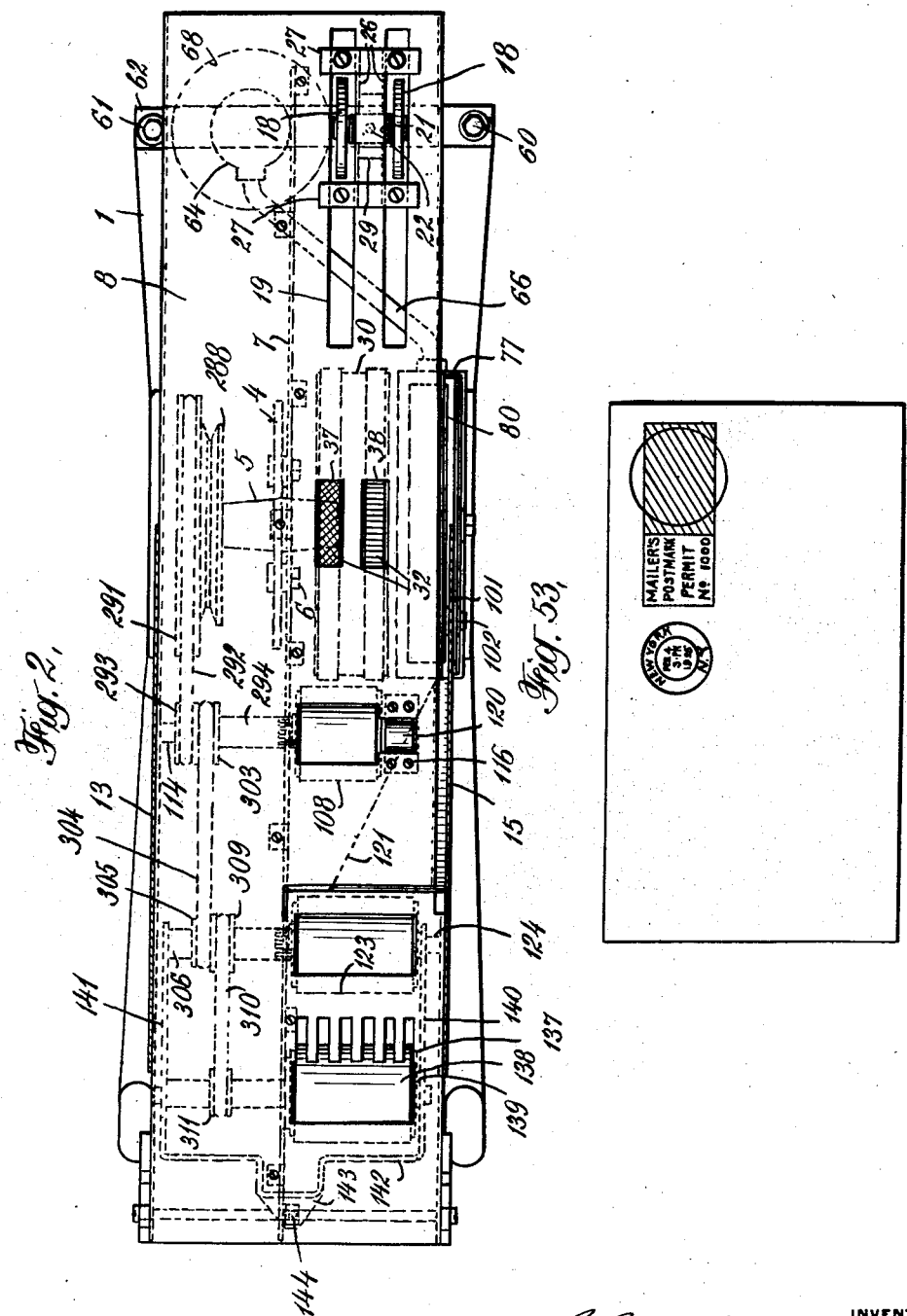

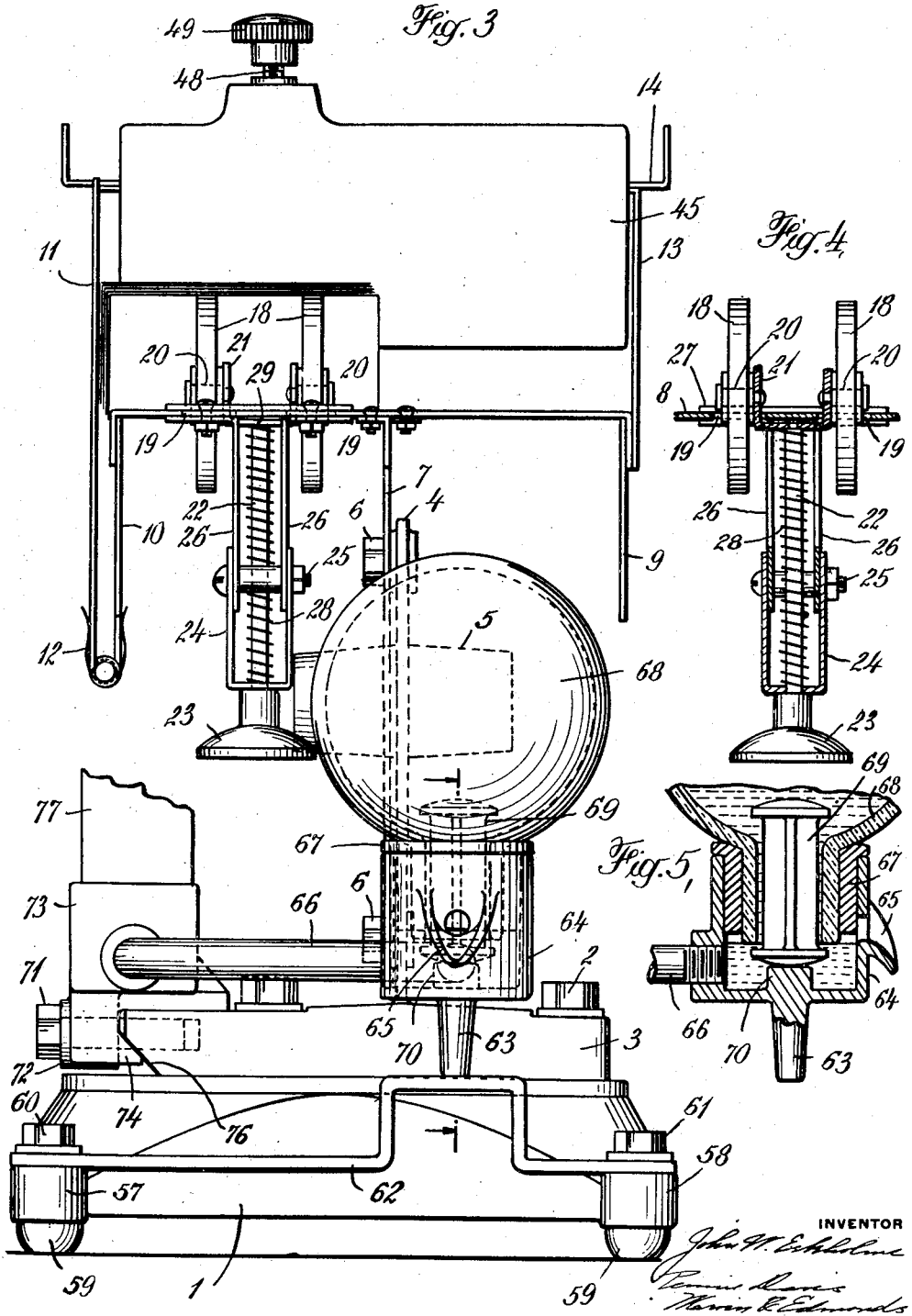

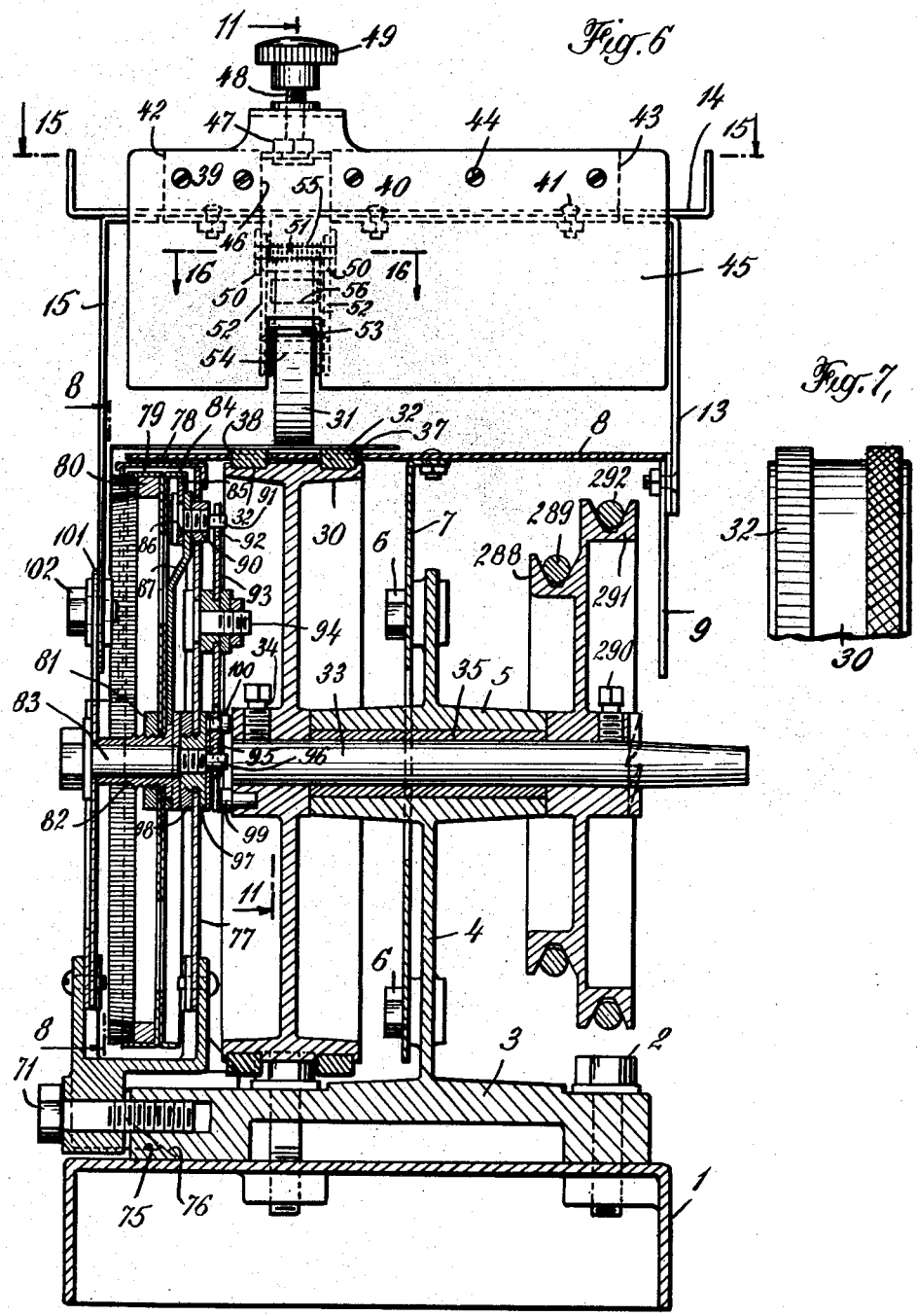

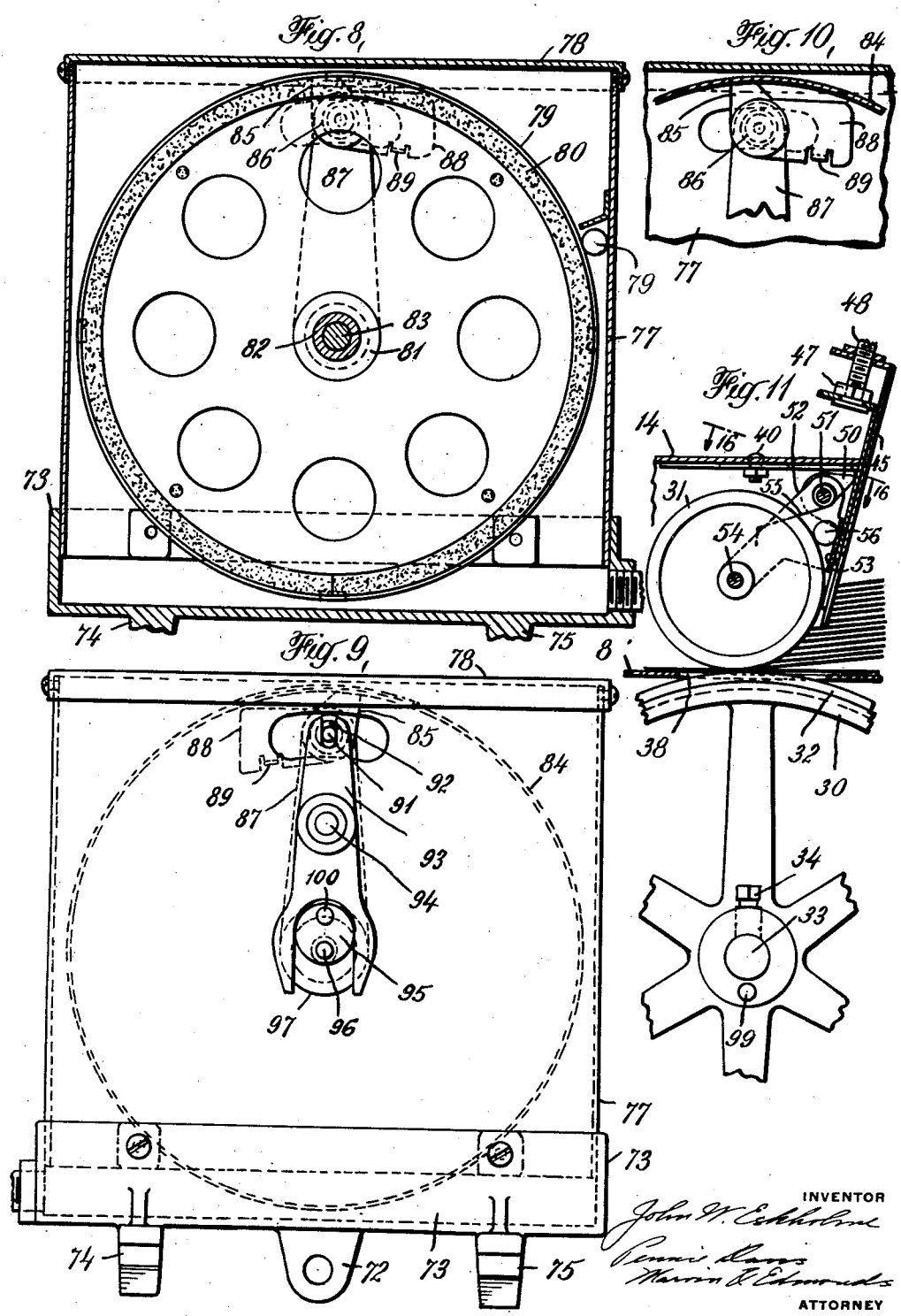

June 21, 1927.
J. W. ESKHOLME
1,633,245
STAMP CANCELING MACHINE
Original Filed March 9, 1925    13 Sheets-Sheet 6
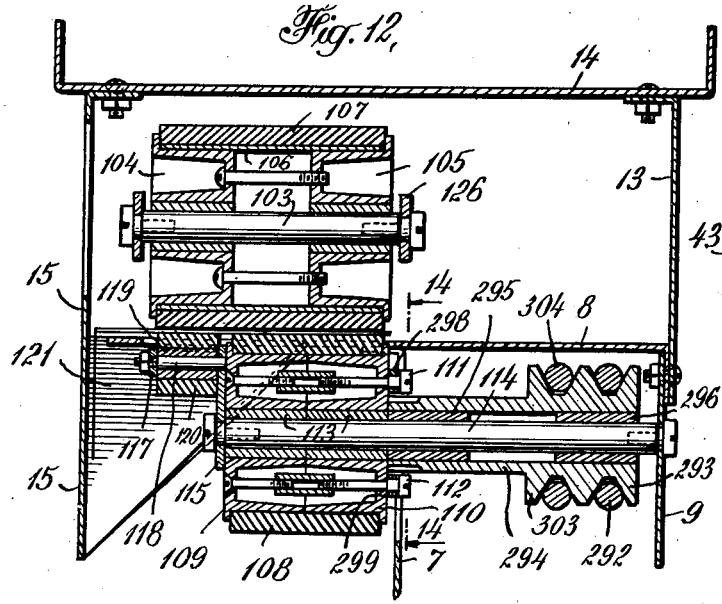
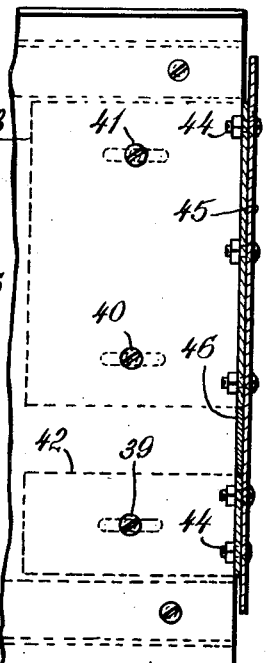
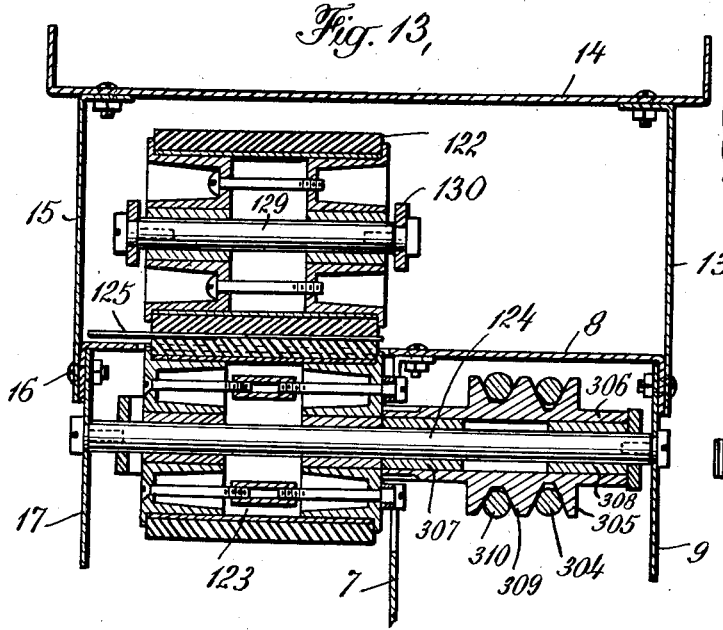
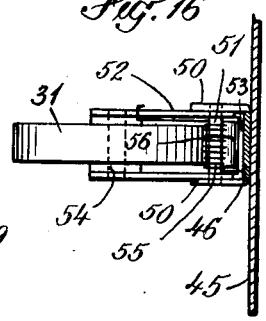
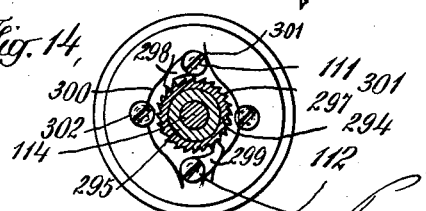
INVENTOR
ATTORNEY June 21, 1927.  
J. W. ESKHOLME  
1,633,245  
STAMP CANCELING MACHINE  
Original Filed March 9 1925    13 Sheets-Sheet 7

INVENTOR  
John W. Eskholme  
ATTORNEY

June 21, 1927.

J. W. ESKHOLME 1,633,245

STAMP CANCELING MACHINE

Original Filed March 9 1925     13 Sheets-Sheet 8

INVENTOR

ATTORNEY

June 21, 1927. 1,633,245
J. W. ESKHOLME
STAMP CANCELING MACHINE
Original Filed March 9 1925    13 Sheets-Sheet 9

INVENTOR
John W. Eskholme

ATTORNEY

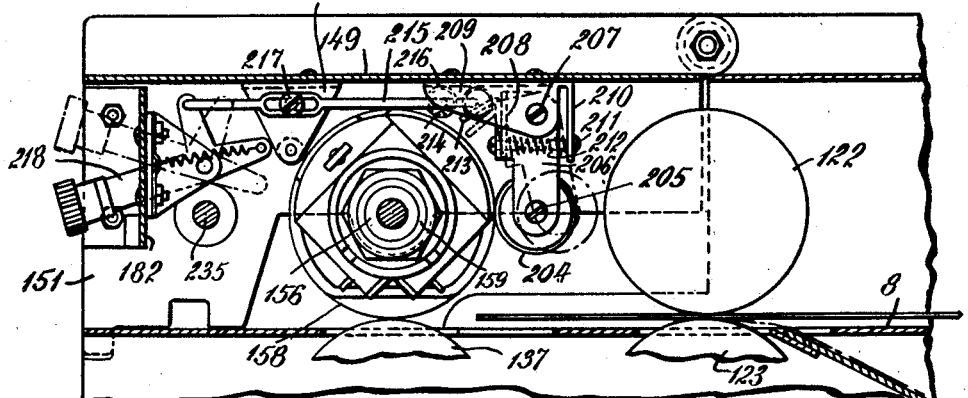
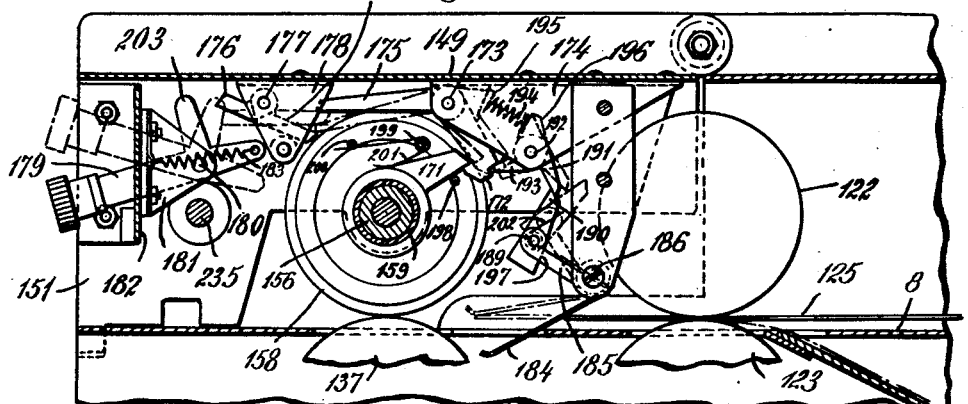
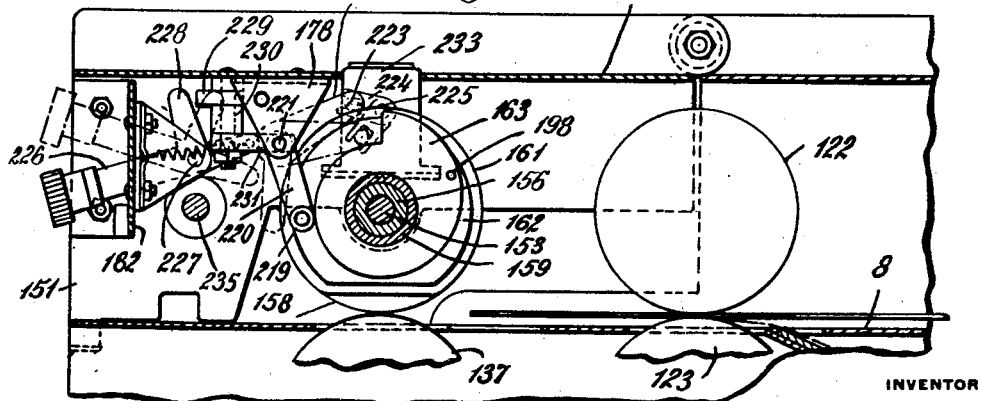

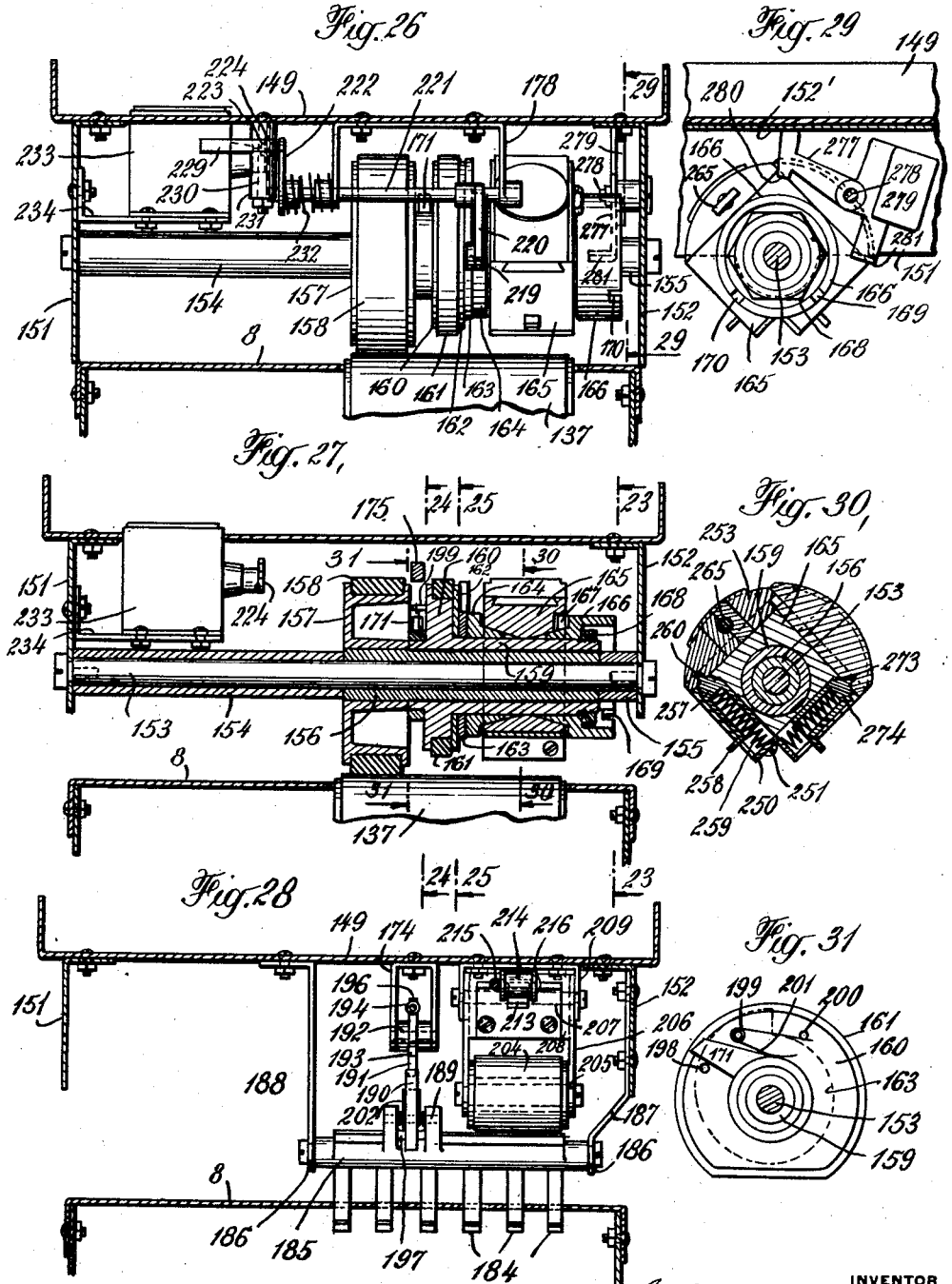

June 21, 1927.
J. W. ESKHOLME
1,633,245
STAMP CANCELING MACHINE
Original Filed March 9 1925    13 Sheets-Sheet 12
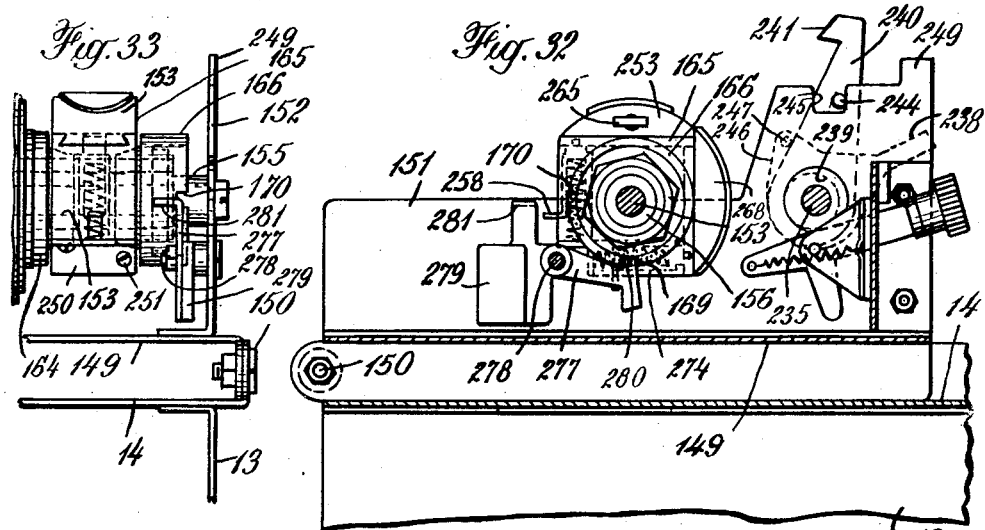
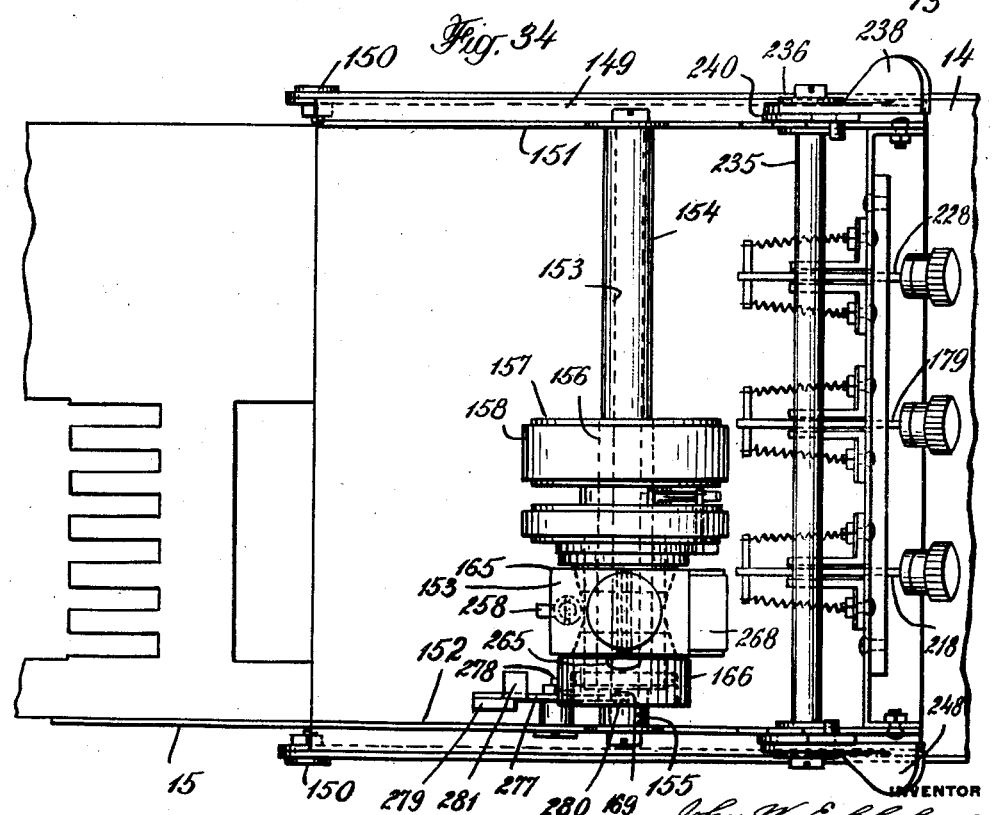

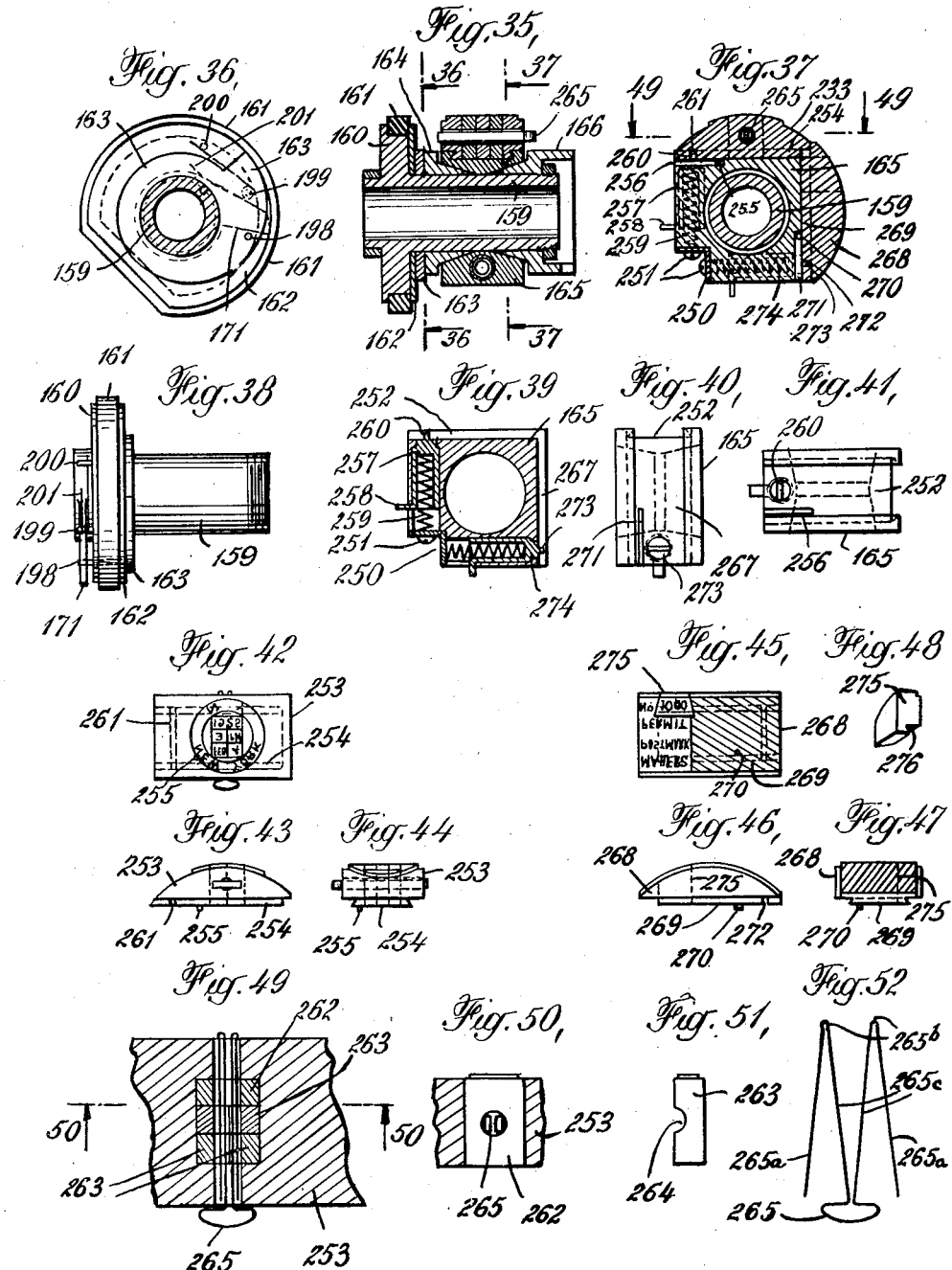

Patented June 21, 1927.

1,633,245

UNITED STATES PATENT OFFICE.

JOHN W. ESKHOLME, OF EAST ORANGE, NEW JERSEY, ASSIGNOR TO RED STAR APPLIANCES, INC., OF NEW YORK, N. Y., A CORPORATION OF DELAWARE.

STAMP-CANCELING MACHINE.

Original application filed March 9, 1925, Serial No. 14,045. Divided and this application filed November 17, 1925. Serial No. 69,593.

The present invention relates to machines for handling envelopes, cards, and other flat objects, and is capable of a variety of uses.

It is an object of the present invention to conveniently provide for the sealing of envelopes.

It is a further object of the invention to provide for printing with ink on a sealed envelope or on a flat card, as for instance to cancel the stamp on an envelope and to print adjacent to the canceled stamp the name of the post office, a date, the hour and the permit number of the user.

It is a further object of the invention to count the number of envelopes, cards, or other flat objects passed through the machine, not for the benefit of the Government in calculating the amount of postage paid thereon, but for the information of the user of the machine.

Although the machine is capable of a wide variety of uses, its greatest utility lies in sealing stamped envelopes and then canceling the Government stamp and counting the number of stamps so canceled. Envelopes to be used in this way may be of the character now furnished by the United States Government and having the postage stamp formed directly in the paper of the envelope, or equally well, may be a plain envelope to which an adhesive Government stamp has been affixed.

When the sealed envelopes come from the machine with the stamps canceled, and with the name of the post office and the date printed thereon, they can be delivered in bulk to the post office and there can be distributed directly into the outgoing pouches without the delays and labor incident to first placing them face up on the sorting table and then passing them through the stamp canceling devices now commonly used by the Government employees. In other words, much of the labor now required at the post office is done before the mail reaches the post office with a consequent saving in time in placing the mail in transit to its destination.

The machine of the present invention has a new type of receiving platform on which the envelopes may be stacked horizontally with their open flaps hanging downward over the side of the platform in shingled relation, means being provided at the side of the stack for keeping the envelopes in proper alignment with a feed roll to which they are to be delivered one by one from the bottom of the stack. The platform also includes an adjustable anti-friction device of novel character adapted by spring pressure to automatically tilt the stack as the number of envelopes in the stack progressively decreases.

The machine also embodies a novel barrier of cylindrical form coacting with the feeding roll and having a slight automatic movement in a direction opposite to that of the feeding roll whereby the wear on the baffle is distributed over its entire cylindrical face.

A moistening device and water fountain of novel construction serves to moisten the downwardly hanging flaps of the envelopes during their passage one by one over the feed roll. Transfer rolls and a coacting inclined guide serve to fold the gummed flap of an envelope upward against the body thereof. The envelope then passes to a pair of sealing rolls where it is firmly squeezed to secure good adhesion of the gummed flap.

When the envelope passes from the sealing rolls it trips a printing mechanism which by its rolling movement over the travelling envelope cancels the postage stamp thereof and prints adjacent to the canceling imprint other vital data, such as the name of the post office, the date, and hour of cancellation. Counting mechanism operatively connected with the printing device records the number of printed imprints and consequently, the number of stamps canceled. The printing mechanism itself is so mounted that it can be swung upward into inverted position to give access to the dies and type with which it is equipped, and the type and dies are so secured in place that their replacement is a matter of but a moment's work, no special tools being required.

Manually controlled levers are provided for throwing the counting mechanism out of action, for throwing the printing roll out of action, and for throwing the inking roll out of action, when occasion may require, so that if desired, the machine may be operated simply as an envelope sealing machine.

Power for the machine is supplied by an electric motor compactly mounted, and those rotating elements of the machine which travel at high speed are equipped with wooden bearing sleeves which are silent in operation and to which no lubricating oil need be applied by the operator. There is, therefore, no chance that dripping oil will mar or soil envelopes or other articles being passed through the machine.

This application is a division of my co-pending application, Serial No. 14,045, filed March 9, 1925.

Other details and objects of the complete machine will become clear from the following detailed description taken in conjunction with the accompanying drawings.

Fig. 2 is a sectional plan view of the same on the line 2—2 of Fig. 1.

Fig. 3 is an end elevation of the complete machine as seen from the right of Fig. 1;

Fig. 4 is a detail of the anti-friction rollers on the receiving platform;

Fig. 5 is a sectional detail of the water fountain and its valve;

Fig. 6 is a transverse section on the broken line 6—6 of Fig. 1;

Fig. 7 is a fragmentary detail showing the rubber friction surfaces of the main envelope-feeding drum;

Fig. 8 is a side elevation of the revolving moistening brush, or more strictly speaking, is a vertical section on the line 8—8 of Fig. 6;

Fig. 9 shows the moistening device from the rear and in elevation, and particularly the means for ratcheting the brush to produce an intermittent rotary movement;

Fig. 10 is a detail of the frictional ratcheting mechanism;

Fig. 11 is a fragmentary vertical section on the line 11—11 of Fig. 6;

Fig. 12 is a transverse section on the line 12—12 of Fig. 1, showing a pair of transfer rolls;

Fig. 13 is a transverse section on the line 13—13 of Fig. 1, showing the sealing rolls;

Fig. 14 is a detail of a clutch as it appears in section on the line 14—14 of Fig. 12;

Fig. 15 is a plan view of the adjustable plates shown at the top of Figs. 6 and 11;

Fig. 16 is a horizontal section on the line 16—16 of Figs. 6 and 11;

Fig. 23 shows the inking mechanism as it appears in vertical section on the line 23—23 of Fig. 27;

Fig. 24 shows the printing mechanism as it appears in vertical section on the line 24—24 of Fig. 27;

Fig. 25 shows details of the counting mechanism as it appears in vertical section on the line 25—25 of Fig. 27;

Fig. 26 shows the counting mechanism as it appears in vertical section on the line 26—26 of Fig. 22;

Fig. 27 shows the printing mechanism as it appears in vertical section on the line 27—27 of Fig. 22;

Fig. 28 shows the inking mechanism as it appears in vertical section on the line 28—28 of Fig. 22;

Fig. 29 shows the printing mechanism as it appears in vertical section on the line 29—29 of Fig. 26;

Fig. 30 is a sectional detail of the printing drum and dies on the line 30—30 of Fig. 27;

Fig. 31 shows a lock for the printing mechanism as it appears in vertical section on the line 31—31 of Fig. 27;

Fig. 32 shows a part of the printing mechanism and corresponds to Fig. 23 excepting that a hinged support and elements carried thereby has been swung upward and over against the top of the machine and into the position where changes can be made in the printing dies. Certain elements of Fig. 23 are omitted from Fig. 32 for greater clarity of illustration;

Fig. 33 is an end elevation of the mechanism as shown in Fig. 32, when viewed from the left;

Fig. 34 is a plan view of the elements shown in Fig. 32;

Fig. 35 is a sectional detail of the printing drum and dies;

Fig. 36 is a transverse or vertical section on the line 36—36 of Fig. 35;

Fig. 37 is a transverse vertical section of the printing drum and dies on the line

37—37 of Fig. 35 and is closely related to Fig. 30;

Fig. 38 is a plan view of the printing drum stripped of the die holder which it normally carries;

Fig. 39 is a section of the die holder alone;

Fig. 40 is an end elevation of the same;

Fig. 41 is a plan view of the same when positioned as in Fig. 39;

Fig. 42 is a plan view of the die and its removable type;

Fig. 43 is a side elevation of the same;

Fig. 44 is an end elevation of the same;

Fig. 45 is a plan view of the stamp conceling die;

Fig. 46 is a side elevation of the same;

Fig. 47 is an end elevation of the same;

Fig. 48 is a perspective view of a removable type bearing the user's number.

Fig. 49 shows the means by which the type are held in the die, as it appears in section on the line 49—49 of Fig. 37;

Fig. 50 is a section on the line 50—50 of Fig. 49;

Fig. 51 shows one of the removable type in elevation with its printing face at the top;

Fig. 52 is a detail of the type holding spring;

Fig. 53 (Sheet 1) indicates the appearance of a stamped envelope after it has been passed through the machine for cancellation of the stamp and for printing of the name of the post office and the date of cancellation.

*Frame work and receiving platform. (Figs. 1, 2, 3, 4, 6, 13 and 20.)*

Figure 1:
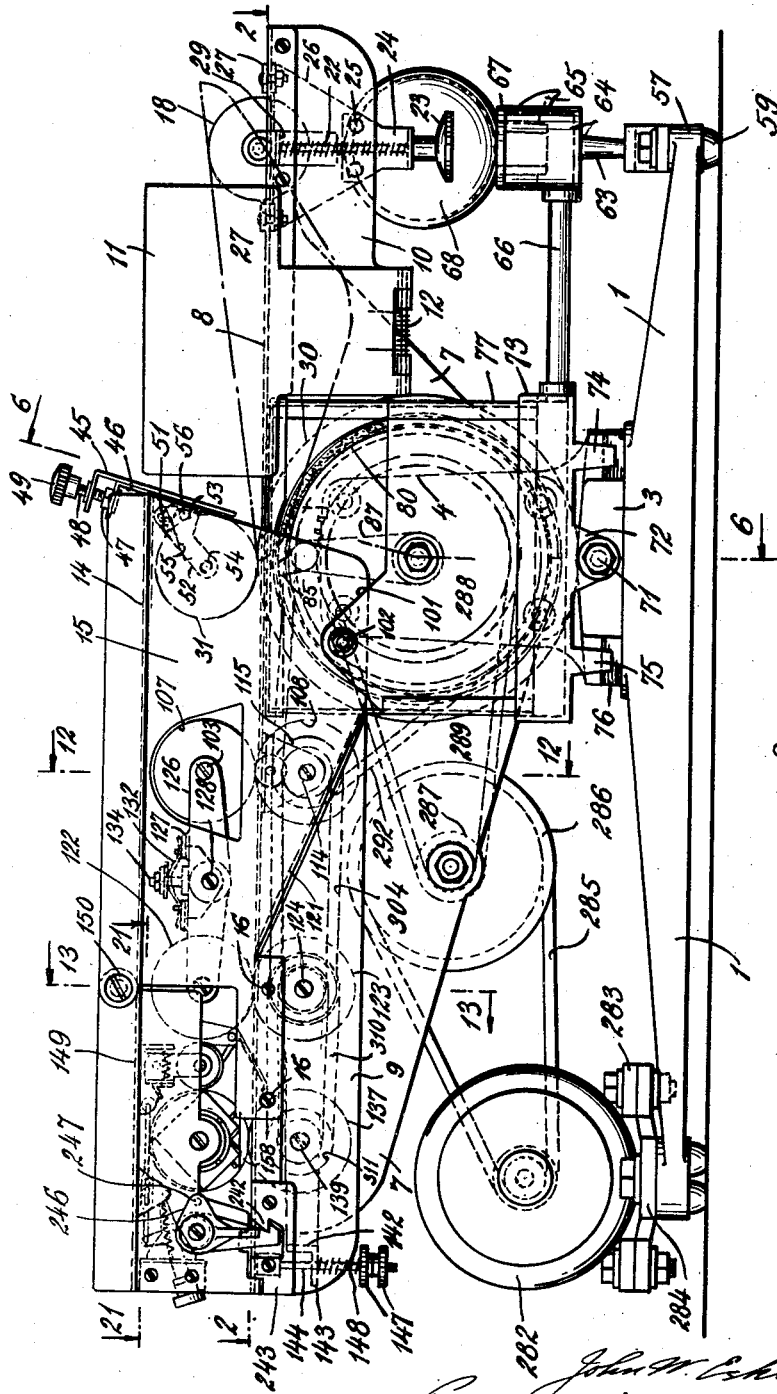
Fig. 1 is a side elevation of the complete machine.
Figure 17:
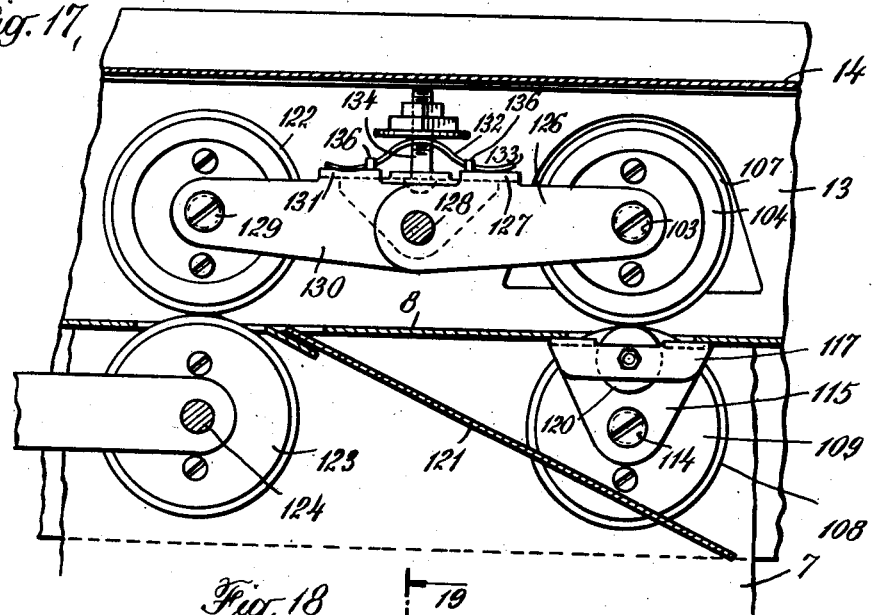
Fig. 17 is a side elevation of the transfer and sealing rolls and of associated means, whereby the flap of the envelopes is closed and pressed against the body of the envelope.
Figure 18:
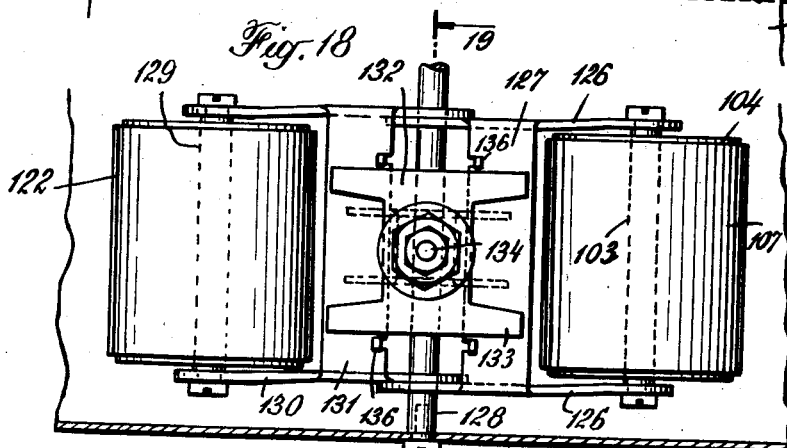
Fig. 18 is a plan view of the same.
Figure 19:
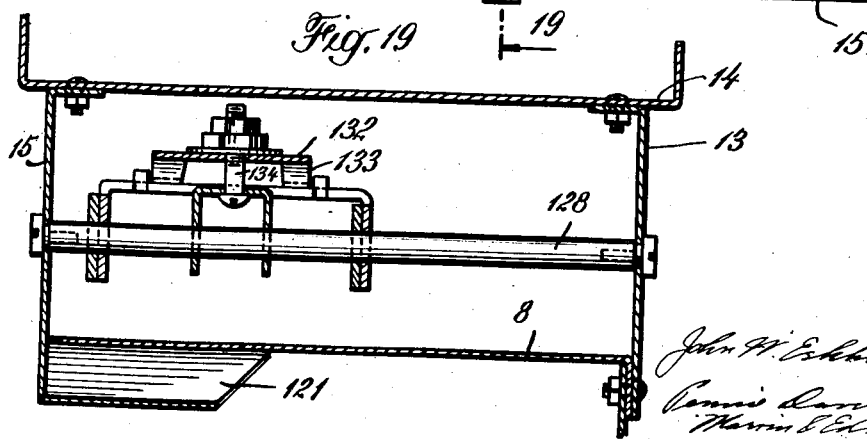
Fig. 19 is a transverse section on the line 19—19 of Fig. 18.

The frame work of the machine comprises a cast metal base 1 to which is secured, by a plurality of bolts 2, a sub-base 3 integral with which is a vertical supporting plate 4 carrying a hub 5 to serve as bearing support for certain of the rotating elements. Secured to the vertical plate 4 by bolts 6 is a central sheet metal plate 7 on the flanged upper edge of which is bolted a sheet metal platform 8 which extends the entire length of the machine. To its down-turned rear edge (Fig. 6) is bolted a long lower apron 9 which extends throughout the length of the machine. On the front down-turned edge of platform 8 is a short lower apron 10 (Figs. 3 and 1) to which is hinged a vertical guide plate 11 (Figs. 1 and 3). At the hinged connection is a coiled spring 12 for controlling the position of guide plate 11.

Above platform 8 and supported by a rear wall 13 bolted thereto is a cover plate 14 which covers the left hand two-thirds of the machine as viewed in Fig. 1, and which serves as the support for certain adjusting mechanisms. The front edge of cover plate 14 is carried by a front wall plate 15 (Fig. 13) secured along its lower edge by bolts 16 to a short front apron 17 bolted to the down turned front edge of platform 8.

The receiving platform for the envelopes to be sealed and then canceled is at the right hand end of the machine as viewed in Fig. 1, and includes a pair of antifriction rollers 18, the details of which are shown in Figs. 2, 3 and 4.

Platform 8 is provided with a pair of parallel slots 19 (Fig. 2) through which rollers 18 may project to contact with a stack of envelopes horizontally placed thereon. Each roller is mounted to turn freely on a pin 20, the inner end of which is riveted to a vertical leg of a U-shaped support 21. That U-shaped support 21 is carried on the upper end of a pull-rod 22 to the lower end of which is secured a handle 23. This pull-rod is guided by a U-shaped plate 24 secured by bolts 25 (Fig. 4) to a pair of brackets 26, the upper horizontal legs of which contact with the lower face of platform 8 and transversely bridge the parallel slots 19 thereof. To hold this mechanism against free sliding movement along slots 19, there are provided a pair of transverse bars 27 (Fig. 2) through which bolts pass for threaded engagement in the horizontal upper legs of brackets 26. A coiled spring 28 encircles the pull-rod 22 and thus tends to keep the rollers in their upper most position and projecting well through platform 8. But when occasion requires, the operator may pull down on handle 23 and thus bring the top of rollers 18 flush with the top of platform 8. During that downward movement, the rollers and their supporting mechanism are guided in brackets 26 by ears 29 (Figs. 2 and 3) integral with the U-shaped plate 21 and adapted to rub at their edges along the inner faces of brackets 26. Freedom of movement along slots 19 is of advantage in adapting the machine to envelopes of different sizes and the bolts which connect the transverse bars 27 with the horizontal upper legs of brackets 26 are not screwed up so tight but that the operator can move the mechanism along slots 19 as the occasion may require.

If no anti-friction rollers were used and the stacked envelopes were permitted to lie flat on table 8, the frictional engagement of the lowermost envelope with the table top would be greater than is desired. It is the primary function of rollers 18 to reduce friction at this point. There is, however, much convenience and some operative advantages in having the rollers so supported by a spring that they will be depressed when a full stack of envelopes is placed over them. Except for this, there would be danger that one or more of the top envelopes might slide down between the stack and baffle plate 45 and there impede free passage of some of the envelopes over the drum 30. As soon as the operator completes the work of stacking the envelopes on the platform, rollers 18 move upward to produce a tilting of the stack, thus placing the envelopes in such an inclined position as will facilitate entrance over drum 30.

When the envelopes are stacked for insertion into the machine, the flaps are adjusted at right angles to the bodies, as indicated in Figs. 1 and 3. The lowermost envelope is brought into proper alignment with the rolls when the envelopes are placed on the receiving platform and spring-pressed vertical plate 11 is relied on to force the stack over progressively so that the lowermost envelope will, at all times, be in proper alignment.

*The feeding rolls.*
(*Figs. 1, 2, 6 to 11, 15 and 16.*)

The lowermost envelope from the stack is gripped between the large feeding roll or drum 30 and a small upper roll 31. Feeding roll 30 has a pair of annular recesses in its working face in each of which is secured a rubber tread 32 with corrugated or knurled faces as shown in Fig. 7. This drum 30 is mounted on a drive shaft 33 to which it is locked by a set screw 34 (Fig. 6.) Shaft 33 passes through hub 5 in which is an anti-friction wood lining 35 so constituted as not to require application of lubricating oil.

Roll 31 has smooth yielding face of rubber or like material and does not rotate from frictional engagement with an envelope passed between it and drum 30, but, on the contrary acts as a restraining baffle for all but the lowermost envelope and at the same time presents a yielding surface along which the envelope can be dragged by the rubber surfaces of drum 30. Platform 8 is provided with a pair of longitudinal slots 37 and 38 (Fig. 2) through which the rubber treads of drum 30 project slightly. Roll 31 is positioned midway between these two slots, as appears from Fig. 6, and thus contacts with that part of the envelope which bridges a gap between the rubber treads 32.

The smooth yielding rubber face of roll 31 is subject to considerable wearing action from envelopes sliding under the roll and provision has been made for turning roll 31 with an intermittent movement to equalize the wear on its face, as hereinafter described. Roll 31 is so mounted as to be capable of various other adjustments.

Cover plate 14, at its right hand end, is pierced by three bolts 39, 40 and 41. (Fig. 15.) Bolt 39 passes through a longitudinal slot in the horizontal leg of a bracket 42. The other or outer leg of this bracket is turned upwardly. Similarly, bolts 40 and 41 pass through longitudinal slots in the horizontal leg of a wide bracket 43, the other or outer leg of which is turned upwardly. Secured to these outwardly turned legs of the two brackets by bolts 44 is a baffle plate 45 (Figs. 6 and 11), one function of which is to keep the stack of envelopes from crowding forward against roll 31. Lying against the rear face of baffle plate 45 and guided along its edges by the adjacent up-turned edges of brackets 42 and 43 is a vertically movable plate 46, the upper end of which is bent over as shown in Fig. 11 to engage with a keeper 47 on the lower end of a threaded shaft 48 which passes with threaded engagement through an ear integral with baffle plate 45, and is provided at its upper end with a knob 49. (Fig. 6.) By turning this knob, plate 46 can be made to slide in its guideway. Near the lower end of the plate 46 are two integral ears 50 which are bent forward to serve as supports for a shaft 51 (Figs. 11 and 16). Shaft 51 serves as a pivot for a pair of side plates 52 joined together by an integral bar 53 and provided at their lower extremities with a shaft 54 on which roll 31 may turn. Wrapped around shaft 51 is a coiled wire spring 55, one end of which rests against plate 46, and the other end of which engages one of the side plates 52. This spring holds the roll to its work with a yielding pressure but will permit upward swinging movement of the roll about shaft 51 to accommodate envelopes differing slightly in thickness. This spring connection will take care of any change from a one-page letter to a two-page letter. When the envelopes are much thicker, as when containing circulars or pamphlets, manual adjustment can be made at knob 39 before commencing to pass the envelopes through the machine. The mechanism whereby roll 31 is caused to turn with an intermittent movement to equalize the wear on its face includes a gag roller 56 preferably of soft rubber and floating between roll 31 and its cross-bar 53. The upward thrust on roll 31 produced by its frictional contact with the passing envelope is sufficient to compress slightly the rubber of gag roll 56 and the contacting rubber face of roll 31, so that when the envelope has passed through there will be a slight rebound of these rubber elements to an extent sufficient to turn roll 31 slightly in a direction opposite to that of the traveling envelope. Therefore, in a sense roll 31 may be regarded as a spring-pressed barrier, the wearing surface of which is periodically renewed. Roll 31 can, of course, be turned by hand in a counterclockwise direction as viewed in Fig. 11 to present a new wearing surface for contact with passing envelopes. Ordinarily, however, the intermittent slow rotative movement above described will be entirely sufficient to equalize the wear. Cross-bar 53, by its bearing against the lower end of plate 46, acts as a stop to limit downward swing of roll 31.

*The moistening device and its fountain. (Figs. 1, 3 to 6, 8, 9 and 10.)*

At the right hand end of base 1, as seen in Fig. 1, are ears 57 and 58 for carrying rubber cushions 59, and tapped into those ears are bolts 60 and 61, under which is clamped a cross bar 62. Resting loosely on an upwardly bent portion of this bar is the foot 63 of an automatic water fountain. This fountain comprises a metal cup 64 with an air intake and overflow vent 65, this cup being threaded to one end of a horizontal feed pipe 66. The mouth of the cup is lined with a soft rubber collar 67 within which is loosely but closely fitted the neck of an inverted glass water bottle 68. The mouth of the bottle is at a level just below the air intake 65. This fountain is of the constant level type for water can flow out of the glass receptacle only in proportion as air flows in and air is admitted or excluded in accordance with the level of the water in the lower part of the cup, as will be well understood by those skilled in the art.

A soft rubber check valve 69 is inserted through the neck of the bottle into the position shown in Fig. 5. While the fountain is in use, this check valve rests on a leg 70 integral with the fountain cup and its leg 63, but when the water bottle is to be removed, the valve is released and seats against the neck of the bottle to prevent spilling any residue of water while lifting the bottle out for refilling.

To refill the bottle after removing it from the fountain the operator withdraws the soft rubber check valve 69 as if it were a cork thus leaving the neck of the bottle unobstructed for filling. The valve is then pushed back into the bottle, and it makes no difference which end is inserted for both ends are alike. The cross section of the stem is such as to allow ample space for the passage of air upward and the passage of water downward.

The moistening device, together with the fountain, are easily removable from the machine for purposes of adjustment, cleaning, etc. To insure ease of removal, these elements are fastened to sub-base 3 by a single bolt 71 which passes through a lug 72 integral with the casting 73 which serves as a well for the moistening water and as a support for various other elements. Feed pipe 66 is threaded into a casting 73. Along the bottom edge of casting 73 are two lugs 74 and 75 bevelled to engage with the inclined front edge of a pair of lugs 76 integral with sub-base 3 (Fig. 3). The tightening of bolt 71 brings these inclined faces into wedging engagement and insures accurate alignment of all of the parts associated with casting 73.

A sheet metal box 77 with a detachable cover 78 encloses the moving elements of the moistening device.

The moving elements of the moistening device include an intermittently rotating sheet metal drum 79 within the flanged periphery of which is secured an annular brush 80 with outwardly projecting bristles. This drum turns slowly with an intermittent movement to moisten the bristles by progressive submergence of them in the water of the well 73, but with opportunity for the bristles to drain before being brought into contact with the gummed flaps of envelopes to be sealed.

Drum 79 is secured by a nut 81 to a threaded bushing 82, which is mounted on a bolt 83 on which it can freely turn. Bolted to drum 79 is a sheet metal drum 84 with a flange at its outer edge against which gears a frictional ratcheting device now to be described.

The frictional ratcheting device whereby the moistening brush is given an intermittent rotary movement comprises a dog 85 (Fig. 10) pivoted at 86 to the upper end of an oscillating arm 87. That arm is mounted on bushing 82 (Fig. 8) and is free to swing thereon. Integral with dog 85 is a weight 88, the lower edge of which is kerfed to form a tongue 89 which is bent at right angles to the weight so that it can strike against the edge of bar 87 and thus serve to keep the dog in convenient position for reassembly in case the mechanism is taken apart for cleaning. At 86 (Fig. 6) is a stub shaft on which dog 85 can swing, this shaft being threaded through arm 87 and secured by a nut 90. Beyond the threaded portion of the stub shaft is a cylindrical portion 91 (Figs. 6 and 9) which serves as a pin for engagement with a slot 92 in the upper end of a pivotally mounted oscillating lever 93. This lever 93 is free to swing about a stub shaft 94 supported by box 77 and equipped with a collar, a nut, and a lock nut as shown in Fig. 6. The oscillating movement is imparted to lever 93 by means of a cam 95 which is straddled by the bifurcated lower end of lever 93. This cam is eccentrically mounted and is free to rotate on the reduced cylindrical end 96 of bolt 83. A bushing 97 is threaded to that bolt and is externally threaded to receive a nut 98, the function of which is to grip the wall of box 77 and hold bolt 83 and its associated parts in proper working relation.

A simple form of clutch serves to establish driving connection between the main driving shaft 33 (Fig. 6) and the eccentric cam 95. This clutch consists of a pin 99 projecting at the end of the hub of the drum 30 and adapted by rotary movement to strike against a similar pin 100 projecting from the side face of cam 95. A gas roller 79' holds drum 79 against rotation in reverse direction.

The front wall of box 77 extends slightly about the axis of bolt 83 but is provided with an upwardly extending ear 101 through which passes a bolt 102 to secure the box to the front apron 15 and give support thereto.

When an envelope is passed over drum 30 its depending gummed flap wipes across the damp bristles of the annular brush 80 and the envelope then is pulled forward by the transfer rolls and ultimately is sealed at the next pair of rolls. The bristles of the brush are kept in a properly moistened condition by periodic submergence in the water of the well 73 and the intermittent rotary movement of the brush is slow enough to protect against too much moisture in the bristles across which the envelope is wiped.

When the machine is started up in the morning after it has been standing over night the bristles at the top of the drum will have dried out to such an extent as to be ineffective. There are, however, finger holes in the drum 79 accessible from the front of the machine so that the operator can turn the drum by hand to bring properly moistened bristles into active position preparatory to starting the machine. Except for this the first few envelopes passed through the machine might not have their flaps sufficiently moistened.

*The transfer and sealing mechanisms.*
*(Figs. 1, 2, 12, 13, 14, 17, 18 and 19.)*

The transfer mechanism is used to forward the envelope from the moistening device to the sealing rollers and, as shown in Fig. 12, comprises an upper roller carried on a shaft 103 and consisting of annular castings 104 and 105 bolted together within a metal tube 106. Each casting is lined with an oilless wood sleeve so that its bearing on shaft 103 is suited to high speed without the need for applying lubricating oil. Tube 106 has a rubber face 107. This upper roll is spring supported as hereinafter described.

The other roller of the transfer mechanism comprises a rubber cylinder 108 carried on a pair of castings 109 and 110 secured together as shown in Fig. 12 by two bolts 111 and 112, each of which cooperates with a threaded sleeve and a companion bolt. This lower roller is lined by two abutting oilless wooden sleeves 113 which are free to turn on said shaft 114.

Shaft 114 is bolted at one end to apron 9. The other end is rigidly secured by a bolt to the downwardly extending ear 115 of a bracket, the upper or horizontal position of which is fastened by four screws 116 (Fig. 2) against the lower face of platform 8. This bracket has another and shorter depending ear 117 to support the outer end of a stationary shaft 118 on which is a wood bearing sleeve 119, and a rubber auxiliary roller 120 which acts as complemental to the main lower roll and is driven by frictional engagement with the envelopes. The lower roller cannot well be made of the same width as the upper roller because of the presence of an inclined sheet metal guide 121 used to fold inwardly the moistened flaps of the envelopes. This inclined guide 121 is a prolongation of the front sheet metal wall 15 and acts progressively on the envelope flaps to swing them inward against the body of the envelope. The transfer rollers serve to hold the envelope against the guide while at the same time advancing the envelope to and into the sealing rollers.

The upper sealing roll 122 (Fig. 13) is constructed essentially like the upper transfer roll.

The lower sealing roller 123 is constructed essentially like the lower transfer roller excepting that it is of greater width. It is mounted on a stationary bar 124 bolted at one end to apron 9 and at the other end to apron 17.

Before the envelope reaches this pair of sealing rollers the gummed flap will have been folded into position against the body of the envelope so that the envelope 125 (Fig. 13) can be squeezed between the rubber faces of the rollers to complete the sealing.

The upper transfer roller and the upper sealing roller are yieldingly mounted in a manner now to be described. The upper transfer roller has its shaft 103 rigidly bolted to the free ends of a pair of plates 126 (Fig. 18) which are connected by an integral cross piece 127 and are pivoted on a stationary bar 128 bolted between rear wall 13 and front wall 15. The upper sealing roller 122 has its shaft 129 similarly mounted on the free ends of plates 130 which are connected by a cross piece 131 and are pivoted on shaft 128. Positioned above cross bars 127 and 131 is a sheet metal spring 132 having four downwardly extending fingers 133 (Fig. 19) two of which press downward on cross pieces 127, and two of which press downward on cross piece 131. This spring is held to its work by an adjusting bolt 134, the lower end of which is anchored in a U-shaped fitting threaded on bar 128. Integral with cross piece 127 are a pair of lugs 136 turned up from the cross piece itself and serving to keep the fingers of the spring from swinging around on bolt 134. The companion cross piece 131 is similarly equipped.

From the sealing rollers the envelope is advanced to the printing mechanism.

*The printing mechanism.*
*(Figs. 1, 2, 13 and 20 to 51 inclusive.)*

The lower roller 137 (Fig. 22) of the printing mechanism has a rubber face 138 and in all of its structural details is essentially like lower sealing roller 123 (Fig. 13). It is supported on a stationary shaft 139 (Fig. 2), the ends of which are bolted to side rails or levers 140 and 141 pivoted at one end on bar 124 and connected at the other end by an integral plate 142 on which is a centrally positioned lug 143 through which passes a rod 144. The upper end of rod 144 (Fig. 22) is provided with an enlargement 145 which is free to swing about a stationary horizontal tie rod 146. The lower end of rod 144 is provided with nuts 147 and an encircling coiled spring 148 whereby lug 143, and consequently, roller 137, are urged upwardly. This yielding support for roller 137 is of importance in insuring a clear imprint regardless of reasonable variations in the thickness of the filled envelope.

Figure 22:
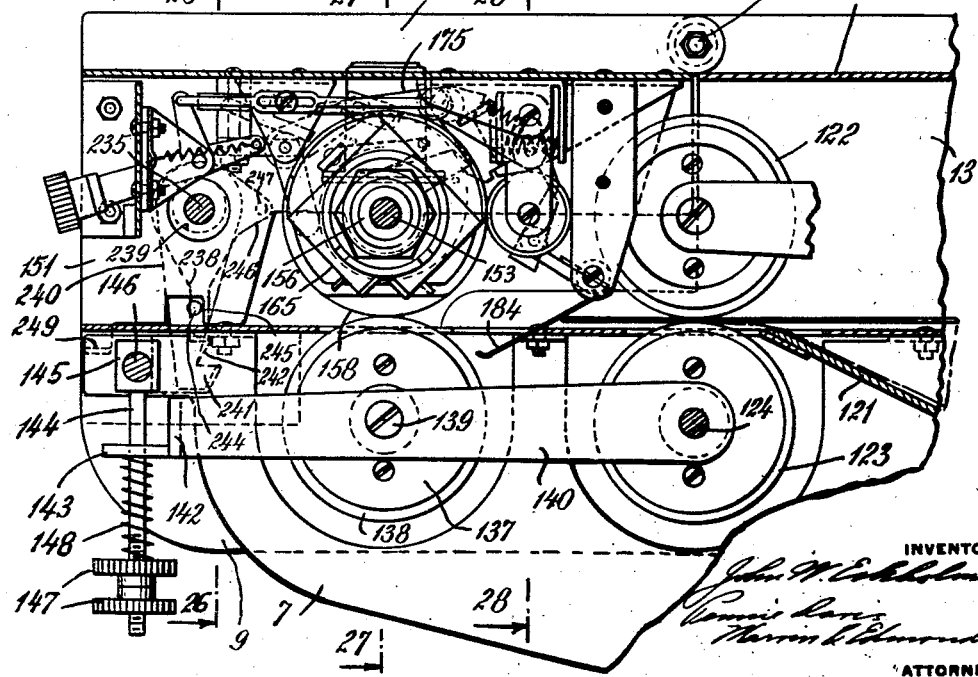
Fig. 22 is an end elevation of the same, or a vertical section on the line 22—22 of Fig. 21.

Referring to Fig. 22 cover plate 14 has a hinged extension 149 pivoted to it on each side by a bolt 150 so that the extension can be swung through 180° to bring the printing roller bottom side up as shown in Fig. 32. This is of convenience when the roller is to be cleaned or the dies or type are to be changed.

As will appear from Figs. 26-28, inclusive, the hinged extension 149 carries depending side plates 151 and 152 bolted thereto. A stationary bar or shaft 153 (Fig. 27) is bolted between these plates and is provided at its respective ends with spacing sleeves 154 and 155 (Fig. 27) between which the printing drum and its driving pulley are mounted. Mounted to turn freely on bar 153 is a wooden sleeve 156, and fitted to that sleeve with a driving fit is a driving pulley 157 having a rubber facing 158. This pulley is driven by frictional engagement with the lower spring-pressed roller 137 or with an envelope passing between the two.

At the side of driving pulley 157 and encircling the wooden sleeve 156 and initially driven thereby by frictional engagement is a printing drum comprising a metal sleeve 159 having a wide flange 160 shod with a rubber ring 161.

A cheek plate 162 holds the rubber ring 161 in position. At the side of this cheek plate is a cam 163 for operating the counting mechanism as hereinafter described.

The printing drum also comprises a collar 164 having a beveled side as shown in Fig. 27 for engagement with the removable printing die holder 165, the details of which are hereinafter described. Cooperating therewith is a second collar 166 having a beveled engagement with the die holder, and also bearing a lug 167 which engages in a recess on the die holder to insure proper positioning of the die holder and proper timing with other parts of the device. Collar 166, die holder 165, collar 164, cam 163, and cheek plate 162 are all rigidly clamped together and against flange 160 by a nut 168 threaded to the end of sleeve 159. Collar 166 projects out beyond nut 168 and has two notches 169 and 170, the purpose of which is mentioned hereinafter.

The printing operation must be so timed that the imprint will be impressed in its proper place on the envelope. Also for certain classes of work it is desirable to seal the envelopes without printing anything on them. These needs are taken care of in the present machine by a latching device controlled in position and in operation by a hand lever accessible at the end of the machine. Similarly it is at times desirable to throw the inking mechanism out of action. These details of the complete machine will now be described, reference being had to Figs. 23-28, inclusive.

Figure 21:
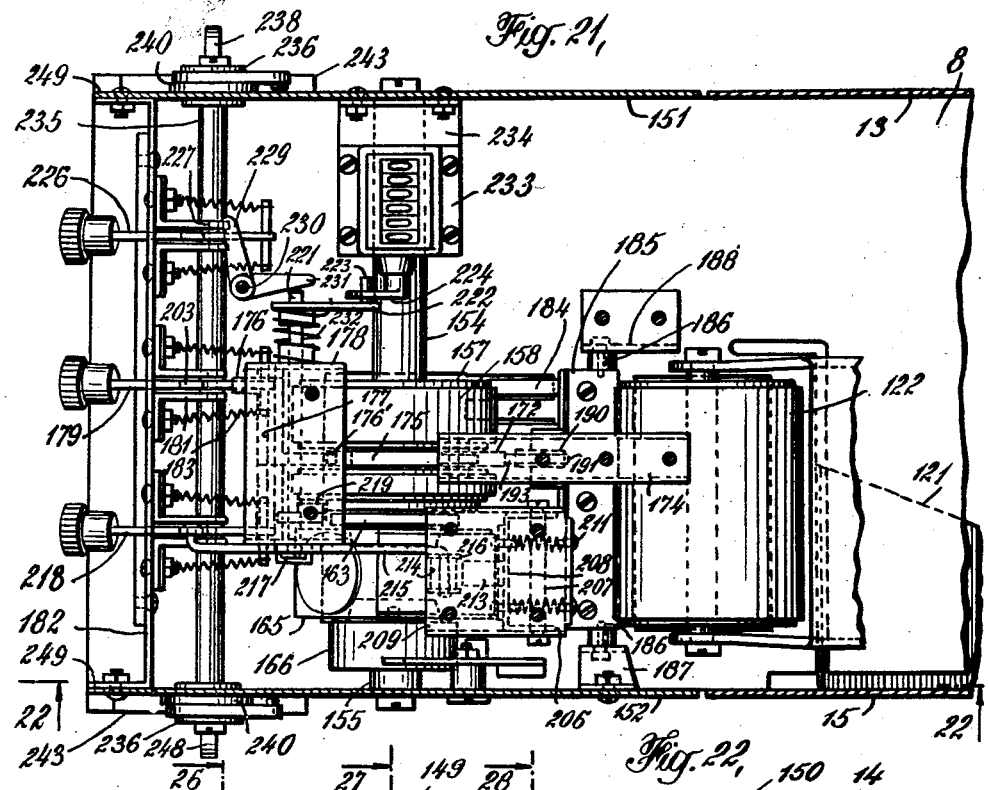
Fig. 21 is a detailed plan view of the printing, counting and inking mechanism, with the cover plate of the machine removed, or more strictly speaking, is a horizontal section on the line 21—21 of Fig. 1.

Referring to Fig. 24 which is a vertical section on the line 24—24 of Fig. 27, there is a dog 171 mounted on a hub of sleeve 159. The nose of this dog is in position for engagement with a latch 172, Fig. 24, this latch being pivoted at 173 on a metal bracket 174. Many of the parts now to be described are shown in Fig. 24 in two positions, the full line position showing normal operation when the printing mechanism is to print on the envelope. Integral with latch 172 is an arm 175, the free end of which is in proximity to a lever arm 176' pivoted at 177 on a sheet metal bracket 178 and having an integral off-set lever arm 176. Coacting with lever arm 176 is a hand lever 179 pivoted at 180 to a pair of brackets 181 mounted on a transverse supporting plate 182 (Fig. 21). Coiled tension springs 183 secured at one end to lever 179 and at the other end to bracket 181 act on the principle of a toggle to yieldingly hold lever 179 in one or the other of the two positions shown in the drawings.

When the envelope comes through between the sealing rolls, it engages a row of yielding fingers 184 (Figs. 24 and 28) all of which are rigidly secured to a casting 185 pivoted on a pair of stub shafts 186. This casting 185 is suspended between supporting arms 187 and 188. The former is bolted to the side plate 152 as shown in Fig. 28, and the latter is bolted to the under surface of the hinged extension 149 of the cover plate 14, as shown in Fig. 28. Casting 185 carries a pair of integral lugs through which is a shaft 189. Pivoted on that shaft is a pawl 190, the working nose of which engages with one arm 191 of a bell crank lever pivoted at 192. Another arm 193 of the bell crank lever has its working nose against the lowermost notched corner of latch 172. A compression spring 194 bears at one end on a shoulder 195 integral with latch 172 and arm 175 and bears at its other end on a shoulder 196 integral with arms 191 and 193.

With the elements in the position shown in full lines in Fig. 24, the operation is as follows:

An envelope 125 moving forward through the sealing rolls will strike fingers 184 and swing them upward to the dotted position, simultaneously rocking arm 185 about pivot 186. The tail end of pawl 190 engages casting 185 at 197 and so is forced to move forward into the dotted position, thereby swinging arm 191 about its pivot 192 and thus disengaging arm 193 from dog 171. Spring 194 effects unlatching as soon as the latch is released, forcing latch 172 into the dotted position. This leaves dog 171 free to turn, thus releasing the printing roll so that it can be driven by the frictional engagement between sleeve 159 and the wooden sleeve 156 on which it is mounted. This brings the printing die and type into rolling engagement with the moving envelope as it passes over roller 137 and in properly timed relation thereto. But after dog 171 swings through the greater part of a circle its nose strikes the lower edge of arm 175 which then is being held in the dotted line position by spring 194 with its tail end seated against the under face of bracket 174, forcing that arm upward and thus forcing latch 172 back to the full line position, while the bell crank lever 193, under the action of spring 194, resumes its original position and locks the latch 172. Ultimately dog 171 strikes again in latch 172 and is stopped thereby.

Effective driving connection between dog 171 and sleeve 159 is effected by means of three pins 198, 199 and 200, and a leaf spring 201. These pins project from flange 160 of sleeve 159. The spring is wrapped around pin 199 and has one end hooked under pin 200, and the other end riding on the upper edge of dog 171. Pin 198 serves as a stop for the dog. As soon as the printing drum has made part of a revolution the rubber face 161 of flange 160 engages the envelope and assists in driving the printing roll.

With the several parts restored to their initial position, as above described, pawl 190 can clear the lower corner of arm 191, but to swing that pawl completely back to the full line position, there is provided a spring 202 coiled about pivot 189 as shown in Fig. 28.

The foregoing description illustrates the normal printing operation with the imprint of the type timed to fall on the stamp and adjacent parts of the envelope, the printing drum making but one revolution for each envelope and in timed relation with the movement of that envelope.

When the machine is to be used for sealing envelopes without doing any printing on them, hand lever 179 (Fig. 24) is thrown upward into the dotted position thus bringing its arm 203 against the beveled end of lever arm 176, forcing that end downward. The opposite lever arm 176' is thereby forced upward engaging arm 175 and acting as a stop against downward swinging movement thereof. Then when an envelope comes through, the resultant swinging of bell crank lever 193 and compression of spring 194 cannot operate to swing latch 172, but leaves that latch in permanent engagement with dog 171. Under these conditions the printing drum will not rotate.

To give adequate clearance for transit of the envelope on which no printing is to be done, flange 160 and its rubber face 161 are flat for a portion of their periphery as shown in Fig. 25, and so do not touch the travelling envelope and are not driven thereby, there being adequate clearance beneath the flat face as shown in Fig. 27.

The die holder is so constructed that for this locked condition of the printing mechanism there is adequate clearance between it and the lower printing roll 137, as will be clear from Fig. 23.

The means for supplying ink to the printing die and type comprises an inking roller 204 (Fig. 23) rotatable on a pivot 205 which is supported between the lower ends of a pair of arms 206 which in turn are pivoted on a bar 207 and are connected together along one edge by an integral strap 208. Bar 207 is supported in a U-shaped bracket 209 bolted to plate 149. This U-shaped bracket has a downwardly extending finger 210 which carries a pair of bolts 211 over each of which fits a horizontal coiled spring 212. The other ends of those springs are seated over the ends of bolts threaded into strap 208. These bolts also secure in position on strap 208, a bent plate 213 which serves as a cam. The means for camming that plate downward about the pivot shaft 207 and thereby swinging the inking roll 204 into the dotted position and out of contact with the printing die, comprises a roller 214 mounted on the bent end of a push bar 215. That roller is provided with shrouds 216 which run along on the under surface of bracket 209. Rod 215 is slotted for guidance over a screw 217 carried by bracket 178. The other end of push bar 215 is pivoted to a bell crank lever 218, like lever 179 of Fig. 24. With the parts in the position shown in Fig. 23 the inking roller is against the printing surface and by raising lever 218 to the dotted position the inking roller can be thrown out of action.

Strap 208 is so positioned that it almost contacts with the under surface of bracket 209 when the inking roller is working thus allowing proper contact with the type and yet when the type faces have been passed from contact preventing the inking roller from swinging far enough forward to ink or smear the irregular surfaces of the die holder.

Counting mechanism.

As a means for keeping count of the number of envelopes or other articles on which a printed impression has been made, use is made of the cam 163 which, as heretofore described in connection with Fig. 27, is rigidly mounted on sleeve 159 and rotates therewith.

Cam 163, (Fig. 27), in addition to being firmly clamped against cheek plate 162 by nut 168 on sleeve 159, has a horizontal pin 198 (Figs. 24 and 25), heretofore mentioned, which protrudes through cheek plate 162 and flange 160, thereby anchoring cam 163 to the adjacent parts and compelling it to rotate therewith.

As shown in Fig. 25, cam 163 is engaged by a roller 219 mounted on the end of a swinging arm 220 which is rigidly attached to a horizontal rock shaft 221 pivoted in bracket 178. Also secured to rock shaft 221 is a second arm 222 carrying at its outer end a pin 223 for engagement in the bifurcated end of a finger 224 rigidly mounted on a rock shaft 225. Shaft 225 is the rock shaft of a counter as hereinafter described.

Inasmuch as cam 163 (Fig. 25) rotates clockwise, its engaging roller 219 will be cammed out and back once for each revolution of the printing drum.

When the printing drum is inactive, the counter is likewise inactive, and to render the counter inactive while leaving the printing drum active, there is provided a disengaging mechanism now to be described by reference to Figs. 21, 25 and 26.

A hand lever 226 identical in detail with hand lever 179 and mounted alongside the latter on plate 182 at the end of the machine is arranged for rocking movement on a pivot 227. Its bent end 228 (Fig. 25) is positioned to strike against an arm 229 mounted to swing about a rigid vertical bolt 230. Integral with arm 229 and offset vertically with respect thereto is a second and smaller arm 231 (Fig. 21) which can swing in a horizontal plane and which engages one end of rock shaft 221. Consequently, upward movement of hand lever 226 into the dotted position of Fig. 25 will push rock shaft 221 endwise far enough to disengage roller 219 from cam 163 by axial movement of the roller. A coiled compression spring 232 serves to return roller 219 into alignment with the face of cam 163 when the control lever 226 is again depressed. This same spring, acting in torsion as shown in Fig. 21, serves to hold roller 219 against the working face of cam 163 during normal operation of the counting mechanism, and likewise controls the swing of the associated parts. Connection is established between rock shaft 221 and a counter 233 of usual type (Fig. 21) by means of the arm 222 and its associated swinging arm 224. Counter 233 is detachably bolted to a bracket 234 which in turn is bolted to the side plate 151, thereby making the counter easily accessible for removal when occasion requires. The upper or reading face of the counter protrudes through plate 149 as shown in Fig. 25.

The hinged extension of the cover plate.
(Figs. 1, 20, 21, 22 and 23.)

As heretofore explained, cover plate 14 has an extension 149 (Fig. 1) hinged on bolts 150 so that plate 149 and the mechanism supported by it and its associated side plates 151 and 152 can be swung over bottom side up to the position shown in Fig. 32, thereby giving access to the relatively intricate parts of the printing drum and its die holder.

Figure 20:
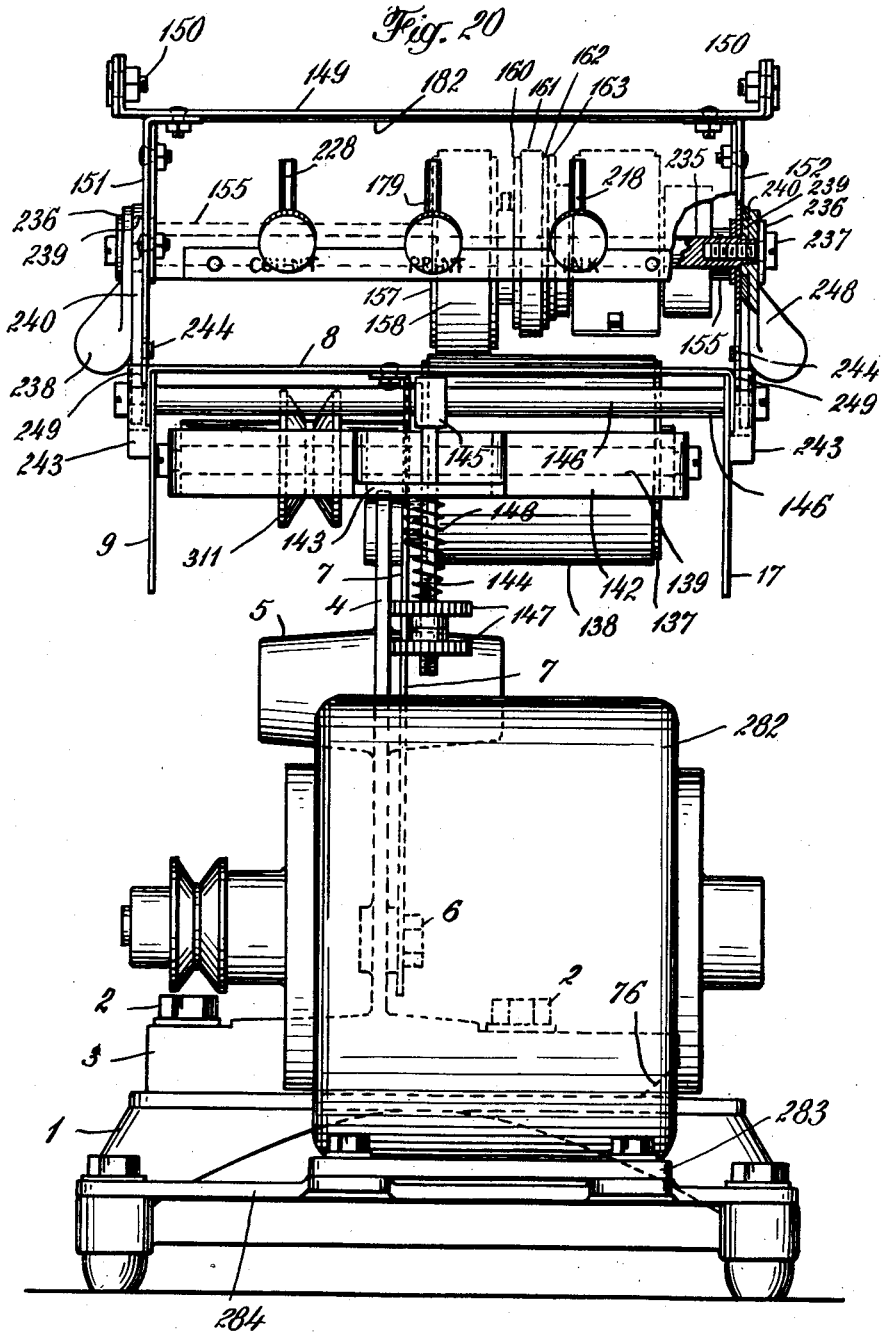
Fig. 20 is an end elevation of the machine as it appears when viewed from the left of Fig. 1, certain parts being omitted for greater clarity.

Referring to Figs. 20, 22 and 32, and for convenience viewing Fig. 32 upside down, there will be found a main shaft 235 which is free to turn inside plates 151 and 152 and at each end is held against longitudinal movement by a washer 236 and a bolt 237 tapped into the shaft as shown in Fig. 20. Immediately adjacent the washer 236, the shaft 235 has a square cross section to accommodate a handle 238 on the side face of which is an eccentric circular shoulder 239 for engagement with a circular recess in a swinging latch 240. Thus latch 240 is free to swing on shoulder 239, and the latter acts as a cam to raise or lower 240 as viewed in Fig. 20. A hook 241 (Fig. 32) on the lower end of latch 240 engages a projection 242 (Fig. 1) on a plate 243 bolted to apron 9. A transverse pin 244 (Fig. 32) carried by latch 240 is movable with the latch back and forth across a slot 245 in side plate 151, but limits swinging movement of the latch. Handle 238 has an extension 246 (Figs. 22 and 32) traversed by a horizontal pin 247 which is positioned to strike against the adjacent edge of latch 240. At the other end of shaft 235 is a similar handle 248 and associated adjuncts as just described.

When the hinged extension 149 is swung from the inverted position shown in Fig. 32 to the normal working position shown in Fig. 22, the operator takes hold of handles 238 and 248, or either of them, and after pushing the pair of latches 240 into position beneath the projections 242 turns handles 238 and 248 and their associated shaft 235 to cam latches 240 upward into tighter engagement with projections 242, thus locking the hinged element tightly in place and preventing it from rattling or from working loose when the printing mechanism is running at high speed. Side play of the hinged extension 149 is prevented by a pair of lugs 249 at the corners most remote from pivot 150 where they overlap the side plates 17 and 9, as indicated in Fig. 22.

When the hinged member is to be released and again lifted, the operator takes hold of handles 238 and 248, or either of them, and cams the latches 240 downward to release their grip on projections 242, and this movement of the handles is continued until pin 247 strikes against the adjacent edge of latch 240 and forcibly backs hooks 241 away from projections 242.

*The die holder and dies.*
*(Figs. 29 to 51.)*

The die holder 165 (Fig. 39) has a circular bore so that it will slip over sleeve 159 (Fig. 38), that circular bore flaring outwardly at each end to accommodate the conical collars 164 and 166 (Fig. 35) as heretofore explained. The periphery of the die holder is substantially square as shown in Fig. 39 but with one corner cut away to receive an angle bar 250 held in place by bolts 251 tapped into the die holder. On one face, the die holder is provided with a slot 252 having undercut or dove tail edges. The die 253 for use in this slot 252 is shown in Fig. 43 and comprises a segment of a cylinder into which removable type can be inserted as hereinafter explained. On the bottom of this segmental die is a tongue 254 dove-tailed to fit in slot 252. To guard against inadvertent substitution of another die in place of this one, there is provided on tongue 254 a lug 255 so positioned that it can slide as a key along a slot 256 (Fig. 41). This arrangement also insures against inserting the die in the guideway wrong end to. To hold the die in proper working position in the guideway, there is provided a spring-pressed cylindrical plunger 257 travelling in a cylindrical hole in die 165. There is a thumb piece 258 on this plunger by which it can be retracted when the die is to be inserted. With the die in its final position, thumb piece 258 is released and spring 259 advances the plunger, bringing a lug 260 at the upper end thereof into locking engagement with a slot 261 (Fig. 43) in the lower face of the die. This die can bear the name of the post office in raised letters thereon, and within the circular printing area thus provided for, may be set up with movable type, a date, hour and year in the manner now to be described.

Within the die 253 is a rectangular recess (Fig. 49) into which is fitted a type 262 having a width equal to that of the recess. Other type bars 263 (Fig. 51) of half that width can be inserted in pairs to carry the month, the day of the month, the hour, and whether morning or afternoon. All of these type bars are provided mid-way their length with a cylindrical cut 264 (Fig. 51) so that there is formed a cylindrical passage through the group of type. Holes are provided in the die in alignment therewith. A spring key 265 is inserted through these cylindrical holes to lock the type in the die. This spring key 265 is of unusual shape and functions in an unusual way. It is made from a flat strip of resilient metal and comprises a pair of arms 265$^a$ connected together by an integral leaf-spring which also serves as a handle, as shown in Fig. 52. Each arm is bent backward at 265$^b$ to form a finger 265$^c$ which engages the type to be held by contacting therewith along the upper and lower corners of the finger, as shown in Fig. 50. When this spring is compressed from its expanded condition, shown in Fig. 52, and is inserted into the cylindrical hole through the die and type the two fingers 265$^c$ assume a relation parallel to one another and are urged outward against the dies partly through resiliency at the bend 265$^b$ and partly because of resiliency at the handle portion of the key. The frictional engagement is so good that the key does not work loose and yet it can be easily and quickly removed by an unskilled operator without the aid of any special tools.

Referring again to Fig. 39, there will be found a second slot 267 similar in all essential respects to slot 252 into which can be inserted the die 268 of Figs. 45 to 47. This die 268 has a dove-tailed tongue 269, the same as the other die and has a lug 270 for cooperation with a slot 271 (Fig. 40) but so positioned that the die cannot inadvertently be pushed into slot 252. With this die also, there is a slot 272 into which is received the lug 273 of spring-pressed plunger 274.
In order that die 268 may bear the permit number of the user of the machine, it is recessed along one edge to receive an auxiliary die 275 which can be slipped into place while the die is being pushed into its slot 267. The dove-tail tongue 276 and the beveled vertical sides of this auxiliary die lock it in working position.

It is the function of die 268 to cancel the stamp on the envelope, as shown in Fig. 53, and to print adjacent to the canceled stamp the mailer's post mark permit number. Adjacent thereto but printed by the other die of the printing drum is the name of the post office, the date, the hour and the year of cancellation.

As a convenient means for holding the die against rotation while changes in the type are being made there is provided a latch 277 (Figs. 29 and 32) pivoted on a stub shaft 278 and provided with a weight 279 at its outer end.

When the printing mechanism is in working position this latch 277 is in the position shown in Fig. 29, with its upper end resting against the inwardly bent end 152' of side plate 152, being held in that position by weight 279, and with its latching nose 280 out of contact with anything. But when the cover plate extension 149 is swung upward about bolts 150 into the inverted position shown in Fig. 32, weight 279 will drop down by gravity and bring the latching nose 280 into engagement with the cylindrical collar 166 (Fig. 27), in position to drop into notch 169, or into notch 170 (Fig. 32). When in notch 169, the die of Figs. 42–44 lies uppermost, and is easily accessible to permit sliding withdrawal of the die. Similarly, spring key 265 can be reached conveniently for withdrawal to release the type, which then can be picked out one by one with tweezers. When the other die is to be removed, the operator puts his finger under the laterally bent tail 281 of latch 277 and lifts weight 279 to swing latching nose 280 out of engagement with slot 169. The die can then be turned 90° and the latching nose will drop into slot 170 thus holding the die of Figs. 45–47 uppermost while its spring-pressed plunger is being retracted and the die slipped out of its slot.

The drive.
(Figs. 1, 2, 6, 12, 13 and 14.)

The machine as a whole is driven by an electric motor 282 (Fig. 1) with its base 283 bolted to a transverse cross bar 284 bolted to base 1, as shown. The drive is through a round belt 285 to speed-reducing pulleys 286 and 287. The latter is connected by a belt 289 to a pulley 288 (Fig. 6). Pulley 288 is secured to drive shaft 33 by a set screw 290. Integral with pulley 288 is a larger pulley 291 having a belt 292 passing to a pulley 293 (Fig. 12) which is formed integral with a cylindrical sleeve 294 carried at either end on anti-friction wooden bearing sleeves 295 and 296.

The end of sleeve 294 most remote from pulley 293 is cut to form a ratchet wheel 297 (Fig. 14). Pawls 298 and 299 pivoted on bolts 111 and 112 engage the teeth of this ratchet, and are biased toward the ratchet by wire springs 300 and 301 each of which is wrapped around an anchoring screw 302 and has a free end bearing against one of the pawls, as shown in Fig. 14. It is through this ratchet that a driving connection is established between sleeve 294 and the lower transfer rollers of Fig. 12.

The normal peripheral speed of the lower transfer roll is slightly faster than the peripheral speed of the large feeding drum 30.

A driving connection to the next pair of rolls is effected by means of a pulley 303 (Fig. 12) integral with pulley 293 and connected by a belt 304 to a pulley 305 (Fig. 13) on a sleeve 306 equipped with anti-friction sleeves 307 and 308 of wood, as shown in Fig. 13. The diameter of pulley 305 is slightly less than that of pulley 303, and, consequently, the peripheral speed of the sealing rolls 122 and 123 is slightly greater than the peripheral speed of the transfer rolls through which the envelope passes to reach the sealing rolls. The sealing rolls thus have a slight tendency to snatch the envelope out of the transfer rolls, thereby guarding against any buckling in the envelope during its transit from one pair of rolls to the other. But the envelope cannot be subjected to a pull severe enough to endanger it for under such a pull the pawls of Fig. 14 will lift their respective springs and permit the transfer rolls to rotate faster than the sleeve with which they are normally connected through the ratchet wheel. Consequently, the tension on the envelope is limited by the pressure with which springs 300 and 301 hold their respective dogs against the ratchet teeth. This is negligible.

Driving connection from sleeve 306 to the lower sealing roll 123 is established through a ratchet drive of the same kind heretofore described in connection with Fig. 14.

Sleeve 306 is provided with a pulley 309 and a belt 310 by which power is delivered to pulley 311 (Fig. 2) on shaft 139, which is the shaft of the lower printing roll 137. Pulley 311 is slightly smaller than pulley 309 so that the printing rolls tend slightly to pull the envelopes from the sealing rolls, the ultimate tension on the envelope being safeguarded by the ratchet connection between sleeve 306 and the lower sealing roll 123.

If the envelope which has engaged with the printing rolls is of such length as simultaneously to be engaged both by the sealing rolls and by the transfer rolls, the speed at which the envelope travels is controlled by the peripheral speed of the printing rolls, the other two pairs overrunning their ratchets sufficiently to protect the envelope from undue strain. Inasmuch as all of the upper rolls are driven by frictional engagement, the envelope is protected from such rubbing as might smear a type-written address thereon.

To operate the machine, the addressed and filled envelopes are placed horizontally in a stack on the receiving platform, with their gummed flaps hanging down in shingled relation to one another and their stamped ends toward drum 30. The lowermost envelope of the stack is caught between the feed rolls and pulled out from beneath the stack and advanced across the laterally projecting moist bristles of the moistening brush. The upper retarding or separating roller meantime acts as a guard or barrier to prevent advancement of other envelopes of the stack. The moistened envelope passes directly forward through the transfer rolls while its downwardly hanging flap strikes against an inclined plate and is gradually folded upward against the horizontal body of the envelope, so that when the envelope reaches the sealing rolls, the flap can be squeezed tightly against the envelope. The sealed envelope then passes to the printing rolls where the postage stamp is canceled and the name of the post office and the date and hour and the user's permit number are printed adjacent to the canceled stamp. The result is the same whether the postage stamp is a part of the envelope or is an adhesive stamp, for the machine is equally effective with either type of envelope.

The printing rolls can be thrown out of action at the will of the operator, the counting mechanism can be thrown out of action without interruption to the printing, and the inking roll can be thrown out of action at any time. There is no occasion for Government supervision of the counting mechanism, for each envelope bears full postage of the proper denomination, whether that postage be in the form of an imprint in the envelope or in the form of an ordinary postage stamp stuck on with adhesive. Data furnished by the counting mechanism is of interest, not to the Government, but to the user of the machine.

The user of a permit number in the printed inscription is a safe-guard against abuse of the privilege of depositing at the post office, in bulk, stamped envelopes on which the stamps have been canceled by some one other than a Government employee.

As will be clear from the above description, the machine is capable of a wide variety of uses in the handling of filled envelopes. It can, of course, be operated as a simple sealing machine, or even as a mere counter of cards and like flat objects, the latter result being effected by removing the die and throwing the inking roll out of action, thus permitting the cards to trip the printing drum, and thereby actuate the counter, but without at the same time receiving any imprint from the printing dies.

A great variety of changes may be made in details of the structure and in the mode of operation of the several parts without departing from the spirit of the invention as defined by the appended claims.

I claim:

1. In a device of the character described, the combination of a pair of horizontal sealing rolls, a printing drum, a lower roll co-acting with said drum, a frame in which said lower roll is mounted, said frame being supported at one end to swing about the axis of the lower sealing roll, and a yielding support for the other end of said frame.

2. In a device of the character described, the combination of a pair of horizontal sealing rolls, a printing drum, a lower roll co-acting with said drum, a frame in which said lower roll is mounted, said frame being supported at one end to swing about the axis of the lower sealing roll, and an adjustable spring supporting the other end of said frame to control the working pressure between the printing drum and its co-operating lower roll.

3. In a machine of the character described, the combination of a feeding drum over which an envelope may be passed, transfer rolls between which said envelope is fed, a pair of sealing rolls and a printing roll, said printing roll having a higher peripheral speed than the sealing rolls, the sealing rolls having a higher peripheral speed than the transfer rolls, and the transfer rolls having a higher peripheral speed than the feeding drum, said transfer rolls and sealing rolls being driven through overrunning clutches, substantially as described.

4. In a machine of the character described, a pair of driven sealing rolls and a printing drum, a driven lower roll co-operating with said printing drum, means for successively feeding envelopes between said sealing rolls, said lower roll being driven at a higher peripheral speed than said sealing rolls, and said sealing rolls being driven through an overrunning clutch, whereby said envelopes may be rapidly withdrawn from said sealing rolls by said printing drum.

5. In a machine of the character described, a printing drum, a lower roll co-acting with said drum, a pair of co-operating sealing rolls for successively delivering envelopes between said printing drum and said lower roll, a pair of transfer rolls for successively delivering envelopes to said sealing rolls, means for driving said lower roll and said printing drum at a higher peripheral speed than said sealing rolls and means for driving said sealing rolls at a higher peripheral speed than said transfer rolls, said transfer and sealing rolls being driven through overrunning clutches whereby envelopes fed through said rolls are spaced apart as they pass said rolls.

6. In a machine of the character described, a pair of sealing rolls, means for successively delivering envelopes between said sealing rolls, means for driving the lower of said sealing rolls through an overrunning clutch, a printing drum with a co-operating lower roll adjacent said sealing rolls, means for continuously driving said lower roll from the lower of said sealing rolls at a higher peripheral speed than said sealing rolls, and means for driving said printing drum from said lower roll upon the approach of an envelope.

7. In a machine of the character described, a pair of horizontal sealing rolls, a printing drum adjacent said sealing rolls, a lower roll engaging said printing drum, spring pressed means forcing the upper of said sealing rolls into engagement with the lower of said sealing rolls, spring pressed means pivotally mounted on the axis of the lower of said sealing rolls and forcing said lower roll into engagement with said printing drum, and means for driving said lower roll and the lower of said sealing rolls.

In testimony whereof I affix my signature.

JOHN W. ESKHOLME.